(12) United States Patent
Keidar et al.

(10) Patent No.: US 9,369,754 B2
(45) Date of Patent: Jun. 14, 2016

(54) VIDEO CONTENT TRACKING

(71) Applicant: QUALCOMM Incorporated, San Diego, CA (US)

(72) Inventors: Ron Keidar, San Diego, CA (US); Chenxi Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/304,721

(22) Filed: Jun. 13, 2014

(65) Prior Publication Data

US 2015/0365715 A1    Dec. 17, 2015

(51) Int. Cl.
| | |
|---|---|
| G06F 3/00 | (2006.01) |
| H04N 21/426 | (2011.01) |
| H04N 21/44 | (2011.01) |
| H04N 21/4405 | (2011.01) |
| H04N 21/4627 | (2011.01) |
| H04N 21/414 | (2011.01) |
| H04N 21/418 | (2011.01) |
| H04L 9/00 | (2006.01) |
| G06F 21/00 | (2013.01) |

(52) U.S. Cl.
CPC .......... *H04N 21/42623* (2013.01); *G06F 21/00* (2013.01); *H04L 9/00* (2013.01); *H04N 21/4182* (2013.01); *H04N 21/41407* (2013.01); *H04N 21/44004* (2013.01); *H04N 21/4405* (2013.01); *H04N 21/4627* (2013.01)

(58) Field of Classification Search
USPC ................................ 726/27; 709/203; 710/68
See application file for complete search history.

(56) References Cited

U.S. PATENT DOCUMENTS

| | | | |
|---|---|---|---|
| 5,357,614 A * | 10/1994 | Pattisam | G06F 3/0601 710/68 |
| 7,805,373 B1 | 9/2010 | Issa et al. | |
| 8,402,280 B1 | 3/2013 | Shi et al. | |
| 2006/0158737 A1 | 7/2006 | Hu et al. | |
| 2006/0233245 A1 * | 10/2006 | Chou | G11B 27/031 375/240.12 |
| 2007/0156599 A1 | 7/2007 | Yoon et al. | |

(Continued)

FOREIGN PATENT DOCUMENTS

EP    1947854 A1    7/2008

OTHER PUBLICATIONS

International Search Report and Written Opinion—PCT/US2015/034956—ISA/EPO—Sep. 29, 2015.

*Primary Examiner* — Joseph P Hirl
*Assistant Examiner* — Sayed Beheshti Shirazi
(74) *Attorney, Agent, or Firm* — Blakely Sokoloff Taylor & Zafman, LLP

(57) ABSTRACT

Disclosed is an apparatus and method to determine usage rules for video content by buffer tracking. A computing device may include a secure processor configured to: store digital rights management (DRM) rules associated with a DRM key and usage rules for a session; command a cryptoprocessor to decrypt video content with the DRM key and to log an output buffer designation of the command to decrypt the video content. The secure processor may command a buffer tracking table to store the output buffer designation of the cryptoprocessor of the command to decrypt and the associated usage rules and a plurality of input and output buffer designations from a plurality of video content drivers, such that, based upon a buffer designation from an output driver to display video content received by the secure processor, the secure processor may determine usage rules to be applied to the decrypted video content for display.

26 Claims, 5 Drawing Sheets

(56) References Cited

U.S. PATENT DOCUMENTS

| | | | |
|---|---|---|---|
| 2009/0180545 A1* | 7/2009 | Wu | H04N 19/149 375/240.25 |
| 2012/0147017 A1* | 6/2012 | Hong | H04N 19/00527 345/506 |
| 2012/0284802 A1 | 11/2012 | Hierro et al. | |
| 2013/0305342 A1 | 11/2013 | Kottilingal et al. | |
| 2014/0053278 A1 | 2/2014 | Dellow et al. | |
| 2014/0118375 A1* | 5/2014 | Abdalla | G06T 15/005 345/545 |
| 2014/0258375 A1* | 9/2014 | Munoz | H04L 67/2847 709/203 |
| 2015/0301763 A1* | 10/2015 | Shaharabany | G06F 3/0613 711/115 |

* cited by examiner

VIDEO CONTENT TRACKING

BACKGROUND

1. Field

The present invention relates to an apparatus and method to determine usage rules for video content by buffer tracking.

2. Relevant Background

Video content protection is typically linked with usage rules that provide rules, such as: which channels the video content can be delivered on; restrictions on recording; restrictions on quality; as well other types of rules. As long as a video system supports a single video stream, the linkage between usage rules and video content is trivial.

However, when a video system is to support multiple video streams, mechanisms need to be provided to indicate which usage rules apply to which video output. In closed systems, where software applications are known and trusted (e.g., in a Set-Top-Box), then the software application that manages the video content can provide the linkage to usage rules in a secure fashion.

Conversely, in open systems, where a software application is not trusted, extra security needs to be provided. In particular, security should be provided at the hardware and/or driver level.

SUMMARY

Aspects of the invention relate to an apparatus and method to determine usage rules for video content by buffer tracking. A computing device may include a secure processor configured to: store digital rights management (DRM) rules associated with a DRM key and usage rules for a session; command a cryptoprocessor to decrypt video content with the DRM key and to log an output buffer designation of the command to decrypt the video content. The secure processor may command a buffer tracking table to store the output buffer designation of the cryptoprocessor of the command to decrypt and the associated usage rules and a plurality of input and output buffer designations from a plurality of video content drivers, such that, based upon a buffer designation from an output driver to display video content received by the secure processor, the secure processor may determine usage rules to be applied to the decrypted video content for display.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of programmable computer device including but not limited to laptop and desktop computers, tablets, smartphones, televisions, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any data processing apparatus.

Figure 1:
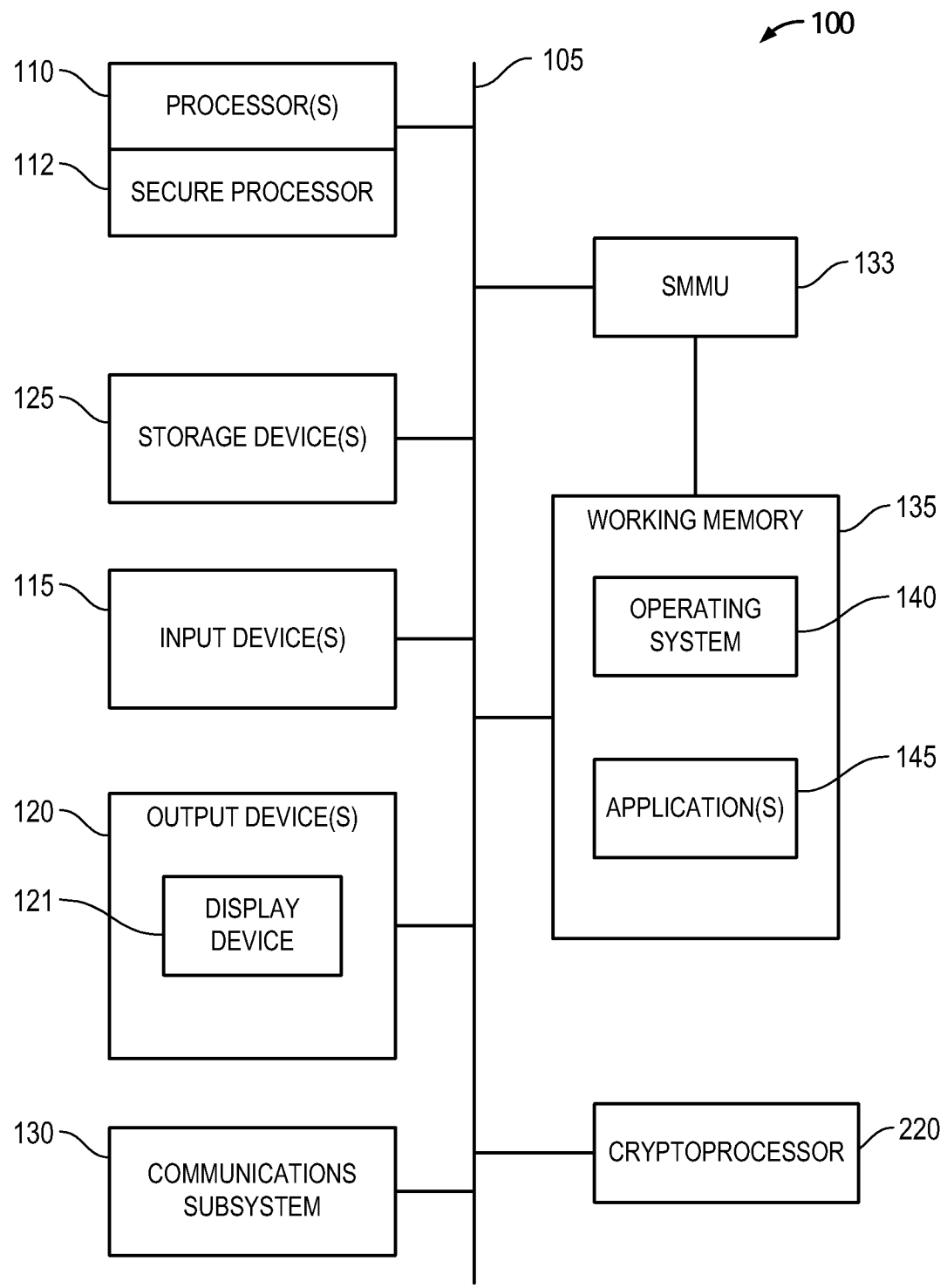
FIG. 1 is a diagram of a computing device in which aspects of the invention may be practiced.

An example computing device 100 that may be utilized to determine usage rules for video content by buffer tracking, in which aspects of the invention may be practiced, as will be hereinafter described in detail, is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as secure processors, digital signal processing chips, graphics acceleration processors, cryptoprocessors, and/or the like); one or more input devices 115 (e.g., keyboard, keypad, touchscreen, mouse, etc.); and one or more output devices 120, which include at least a display device 121, and can further include without limitation a speaker, a printer, and/or the like.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device 100 may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem 130 may permit data to be exchanged with a network, other computer systems, and/or any other devices described herein. In many embodiments, the computing device 100 will further comprise a working memory 135, which can include a RAM or ROM device, as described above. Further, the computing device 100 may include a system memory management unit (SMMU) 133, which is a computer hardware unit that has memory references passed through it, and may be used to perform the translation of virtual memory addresses to physical addresses, in order implement applications. The computing device 100 may also comprise software elements, shown as being currently located within the working memory 135, including an operating system 140, applications 145, device drivers, executable libraries, and/or other code.

Merely by way of example, one or more procedures described with respect to the method(s) discussed below may be implemented as code and/or instructions executable by a computing device (and/or a processor within a computing device); in an aspect, then, such code and/or instructions can be used to configure and/or adapt a general purpose computer (e.g., a computing device) to perform one or more operations in accordance with the described methods, according to embodiments of the invention. A set of these instructions and/or code might be stored on a non-transitory computer-readable storage medium. In some cases, the storage medium might be incorporated within a computer device, such as computing device 100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

In one embodiment, computing device 100 may include a secure processor 112 and a cryptoprocessor 220. Secure processor 112 may be a processor operating in a secure or protected mode utilizing secure or protected storage/memory to perform operations in a secure or protected manner. Cryptoprocessor 220 may be utilized to decrypt and encrypt data. As will be described in more detail hereinafter, secure processor 112 in conjunction with cryptoprocessor 220 may implement embodiments of the invention to determine usage rules for video content and to apply determined usage rules to decrypted video content for display. It should be appreciated that a set of instructions and/or code may be stored on a non-transitory computer-readable storage medium for implementation by processors of computing device 100, such as secure processor 112, as previously described.

Figure 2:
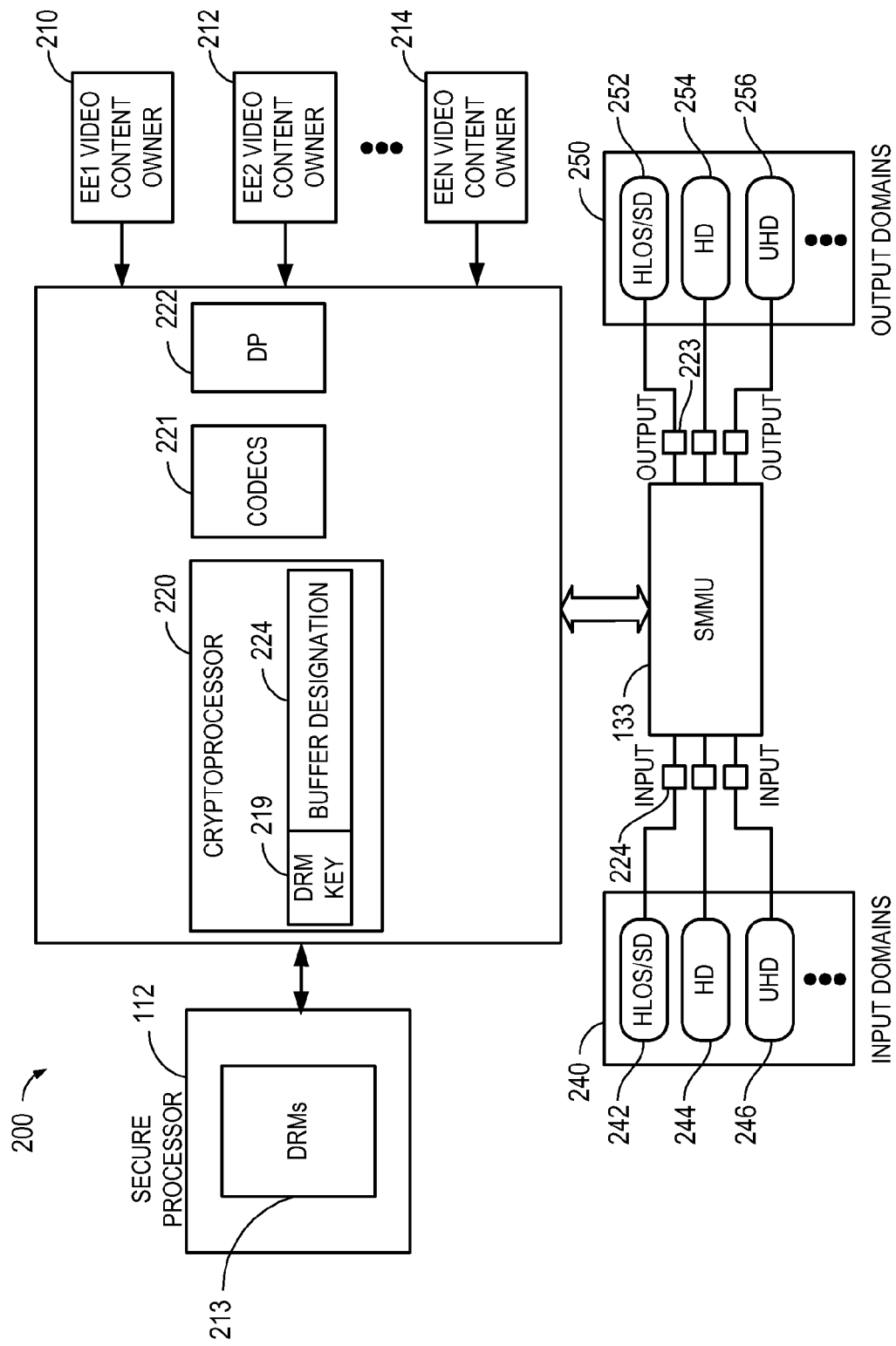
FIG. 2 is an example of a computing environment that includes a secure processor and a cryptoprocessor to determine usage rules for decrypted video content

With additional reference to FIG. 2, an example of a computing environment 200 implementable by computing device 100 that includes a secure processor 112 and a cryptoprocessor 220 to determine usage rules for video content and to apply determined usage rules to decrypted video content for display, in which aspects of the invention may be practiced, will be hereinafter described. Cryptoprocessor 220 may be either a co-processor that performs computationally intensive encoding and decoding of information for a CPU (or other processor) based upon an extended language or may be a cryptoengine that is a separate piece of hardware (e.g., an accelerator processor) that is run by a dedicated software driver for the encoding and decoding of information. In this example, cryptoprocessor 220 is a cryptoengine, and examples hereinafter described, will be in the context of implementation by a cryptoengine. However, as should be apparent to those of skill in the art, these same implementations may be similarly performed by a co-processor.

In this example implementation 200, as will be hereinafter described, various execution environment (EE1-EEN) video content owners 210, 212, 214, after they have been authorized by digital rights management rules (DRMs) 213 stored and implemented by the secure processor 112, and an associated DRM key 219 is approved and stored in the cryptoprocessor 220, a video content owner 210, 212, 214 may communicate decrypted video content for output via output drivers 223 for display. In particular, encrypted video content may be decrypted by the cryptoprocessor 220 utilizing the DRM key 219 such that video content may be outputted for display. Also, a codecs driver 221 may uncompress the video content and a display processing (DP) 222 driver may properly process the video content for display on a device display. Further, as will be described, secure processor 112 may determine usage rules for the video content and may apply the determined usage rules to the decrypted video content for display.

In one embodiment, secure processor 112 is configured to store or to control the storage of digital rights management (DRM) rules 213 including usage rules for a session. The usage rules may include rules, such as: which video outputs the video content can be delivered on; restrictions on recording; restrictions on quality; output blocking; encryption enforcement, as well other types of rules. Also, DRM rules may relate to controlling copying, executing, viewing, copying, altering, etc., video content. Further, secure processor 112 may be configured to store or control the storage of a buffer tracking table, to be hereinafter described in more detail.

Secure processor 112 further commands cryptoprocessor 220 to decrypt video content based on the DRM key 219 associated with a session. The DRM key 219 may be provided and stored by the cryptoprocessor 220 if the secure processor 112 approves a video content owner 210 to display the video content. Therefore, a DRM key 219 may be associated with a session and/or DRM rules. DRM rules may include a content license and usage rules and a DRM key may be associated with a session and/or DRM rules and may be generated by the cryptoprocessor and/or from another source. As an example, the cryptoprocessor 220 may generate a key based upon a negotiation with a video provider. Additionally, the cryptoprocessor 220 is commanded by the secure processor 112 to log an output buffer designation 224 of the command to decrypt the video content that is associated with the usage rules.

Figure 3A:
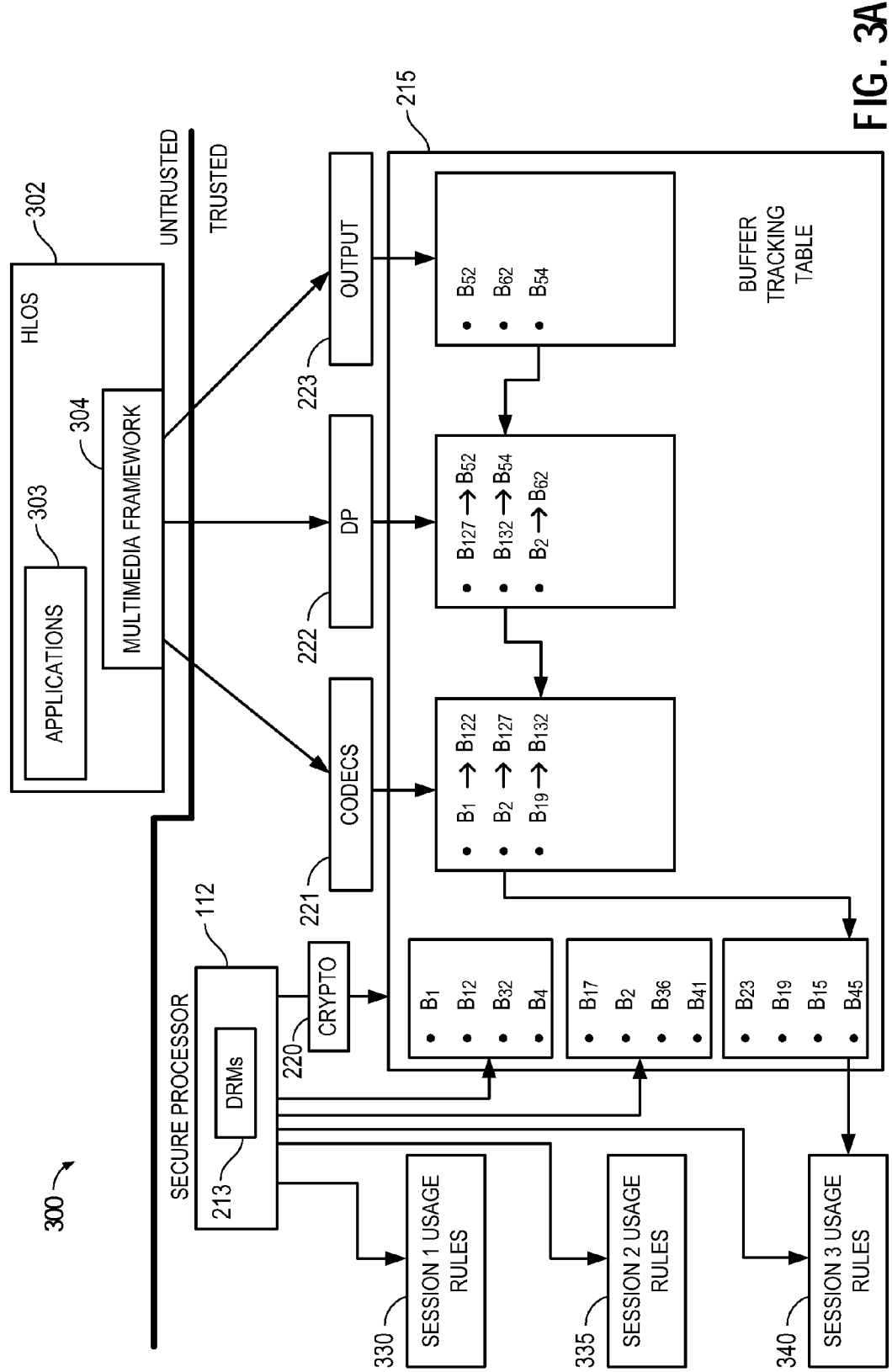
FIG. 3A is an example of how drivers by reporting their input and/or output buffer designations allow the secure processor to determine usage rules to be applied to the decrypted video content.

With additional reference to FIG. 3A, as can be seen in the table 215, the secure processor 112 may command the buffer tracking table 215 to store the output buffer designation of the cryptoprocessor commands to decrypt video content, as well as, a plurality of input and output buffer designations from the commands of a plurality of video content drivers. In a particular example, the buffer tracking table 215 stores input and output buffer designations for commands to uncompress video content commanded by the codecs driver 221. Further, the buffer tracking table 215 stores input and output buffer designations for commands to process video content for display on a device display commanded by the DP driver 222. Also, the buffer tracking table 215 is commanded to store the output buffer designations for the output drivers 223 to display video content. It should be appreciated that, because there may be multiple video content owners (e.g., 210, 212, 214) decrypting different types of video content for display utilizing the cryptoprocessor 220, codecs driver 221, DP driver 222, etc., that the buffer tracking table 215 may include multiple input and output buffer designations for these commands. It should be appreciated that buffer designation may refer to buffer locations in memory.

In one embodiment, secure processor 112, based upon a received buffer designation from an output driver 223 to display video content, stored in the buffer tracking table 215, may determine usage rules from the DRM rules 213 to be applied to the decrypted video content for display. In particular, based upon the received buffer designation from the output driver 223, the secure processor 112, by having the input/output buffer (I/O B) designations of the codecs driver 221 and the DP driver 222 stored in the buffer tracking table 215, can then determine the cryptoprocessor output buffer (O B) designation which serves as the original buffer for the DRM rules 213. Based upon this, the secure processor 112 can determine the associated usage rules such that the secure processor 112 can apply the usage rules to the decrypted video content. Of course, other options may be utilized, such as, output driver 223 walking through the buffer table 215 and determining the usage rules, and thereafter, the output driver applying the usage rules itself.

In this implementation, every driver, e.g., cryptoprocessor 220, codecs driver 221, DP driver 222, output driver 223 reports their input and/or output buffer designation (I/O B) for each of its processing commands to the secure processor 112 which commands that it be stored to the buffer tracking table 215. By collecting these buffer designations from the drivers in the buffer tracking table 215, the secure processor 112 can track back from the received output driver 223 output buffer designation back to the cryptoprocessor output buffer designation, which is the original buffer started by the DRM, which points to the DRM rules 213 and the usage rules associated with the video content, which can then be applied by the secure processor 112 to the outputted decrypted video content for display. In this way, the usage rules are applied by the secure processor 112 based upon buffer tracking table 215 to the video output of the output driver 223, through the trusted world of the secure processor 112, even though the flow of the video content is managed by an untrusted video content owner (e.g., 210).

A particular example will now be described, at the request of a video content owner 210, video content may be decrypted (or encrypted) via a DRM key 219 by cryptoprocessor 220, after approval by the DRM 213 rules as implemented by secure processor 112, which transmits the DRM key 219 to the cryptoprocessor for decryption of the video content. Further, codecs driver 221 may uncompress video content and DP driver 222 may process video content for display on a display device. Encrypted video content may be provided from input domains 240 through input drivers 224 to SMMU 133 and decrypted video content may be provided through SMMU 133 to output domains 250 via output drivers 223. For example, input domains 240 may include high level operating system (HLOS) standard definition (SD) video content 242, high definition (HD) video content 244, and ultra-high definition (UHD) video content 246, whereas similarly, example output domains 250 include HLOS/SD video content 252, HD video content 254, and UHD video content 256. It should be appreciated that these are just example domains, and many different types of domains may be utilized (e.g., enterprise, modem, etc.).

Continuing with this example, video content owner 210 may request that UHD video content 246 for video content owner 210 be decrypted by cryptoprocessor 220. After approval by the DRM 213 rules as implemented by secure processor 112, which transmits the DRM key 219 to the cryptoprocessor for decryption of the video content, the decryption process may begin. Further, codecs driver 221 may uncompress video content and DP driver 222 may process video content for display on a display device. Therefore, video content owner 210 may request that encrypted UHD video content 246 from the input domain 240 be decrypted by cryptoprocessor 220 so that the UHD video content 256 can be outputted as video output for display (e.g., on the display device 121 of the computing device 100 (e.g., a mobile computing device)). Further, based upon the received buffer designation from the output driver 223 (O B), the secure processor 112, by having the I/O B designations of the codecs driver 221 and the DP driver 222 stored in the buffer tracking table 215, can then determine the cryptoprocessor O B designation which serves as the original buffer for the DRM rules 213. Based upon this, the secure processor 112 can determine the DRM rules 213 and the associated usage rules such that the secure processor 112 can apply the usage rules to the decrypted UHD video content from the output driver 223 outputted to the output domain 250 for display (e.g., on the display device 121 of the computing device 100 (e.g., a mobile computing device)). It should be appreciated that this is but one example of the operation of the secure processor 112 and the cryptoprocessor 220 being used to decrypt and display video content and that many different types of execution environments, types of video content data, types of domains, etc., may be utilized.

With particular reference to FIG. 3A, an example of how every driver, e.g., cryptoprocessor 220, codecs driver 221, DP driver 222, output driver 233, by reporting their input and/or output buffer designation (I/O B) for each of its processing commands to the secure processor 112 for storage in the buffer tracking table 215, allows the secure processor 112 to determine usage rules to be applied to the decrypted video content. In this example, it is assumed that one application 303 from a plurality of applications, under the control of a high-level operating system 302, utilizing a multimedia framework 304 that communicates with codecs driver 221, DP driver 222, and output driver 223, makes a request to display video content. In one example, after approval by the DRM 213 rules as implemented by secure processor 112, which may transmit the DRM key 219 to the cryptoprocessor for decryption of the video content, the decryption process begins. However, it should be appreciated that the decryption may be independent of the usage rules. As an example, only the local display of the device may receive the content. It may only be an external display that needs to obey the usage rules, so that the decision to be made is whether the video output interface (e.g., HDMI) is approved by the DRM for a specific content. Further, codecs driver 221 may uncompress video content and DP driver 222 may process video content for display, and output driver 223 may transmit the decrypted video content for display on a display device of the computing device. It should be noted that the applications 303 and HLOS 302 are operating in an untrusted environment whereas the secure processor 112, cryptoprocessor 220, etc., are operating in a trusted environment.

In particular, as previously described, every driver, e.g., cryptoprocessor 220, codecs driver 221, DP driver 222, output driver 223 reports their input and/or output buffer designation (I/O B) for each of its processing commands to the secure processor 112 which commands that it be stored to buffer tracking table 215. Based upon the buffer tracking table 215, secure processor 112 can track back from the received output driver's 223 O B designation back to the cryptoprocessor O B designation, which is the original buffer started by the DRM, which points to the DRM rules 213 and usage rules associated with the video content, which can then be applied by the secure processor 112 to the outputted decrypted video content for display. It should be appreciated that, as previously described, as shown in FIG. 3A, the operational commands and implementations may occur in a trusted zone in cooperation with a secure processor 112, e.g., a virtual secure processor, to create a trusted zone environment. However, it should be appreciated that the use of a trusted zone environment is not required. For example, the operations may be distributed to the driver themselves and a trusted zone implementation is not required.

For example, assume a decryption operation has been approved by a DRM rule 213 for an application 303, as previously described, and the decrypted video content is being outputted by output driver 223 with the O B designation: $B_{54}$. Based upon this, the secure processor 215 can determine in the buffer tracking table that: I/O B designation for the DP driver 222 is $B_{132}$ and $B_{54}$; I/O B designation for the codecs driver 221 is $B_{19}$ and $B_{132}$; and the cryptoprocessor O B designation is $B_{19}$. Based upon this, the secure processor 112 can determine the particular DRM rules 213, and the particular usage rules to be applied, in this case: Session 3 Usage Rules. Therefore, the Session 3 Usage Rules can be applied by the secure processor 112 to the outputted decrypted video content for display.

As another example, assume a decryption operation has been approved by a DRM rule 213 for an application 303, as previously described, and the decrypted video content is being outputted by output driver 222 with the O B designation: $B_{52}$. Based upon this, the secure processor 215 can determine in the buffer tracking table that: I/O B designation for the DP driver 222 is $B_{127}$ and $B_{52}$; I/O B designation for the codecs driver 221 is $B_2$ and $B_{127}$; and the cryptoprocessor O B designation is $B_2$. Based upon this, the secure processor 112 can determine the particular DRM rules 213, and the particular usage rules to be applied, in this case: Session 2 Usage Rules. Therefore, the Session 2 Usage Rules can be applied by the secure processor 112 to the outputted decrypted video content for display. As previously described, the usage rules may include rules, such as: which channels the video content can be delivered on; restrictions on recording; restrictions on quality; as well other types of rules. Also, DRM rules may relate to controlling copying, executing, viewing, copying, altering, etc., video content.

Further, in this way, the usage rules are applied by the secure processor 112 based upon buffer tracking table 215 to the video output of the output driver 223, through the trusted world of the secure processor 112, even though the flow of the video content is managed by an untrusted video content owner application 303 operating under the control of an untrusted high level operating system (HLOS) 302.

It should be appreciated that a wide variety of different types of input/output buffer tracking strategies and tables may be utilized to track back to usage rules, the previously described one being but one example. For example, the previously described methodology may be considered to utilize a circular array of input and output buffer designations to implement buffer tracking to determine the usage rules to be applied to the decrypted video content.

Figure 3B:
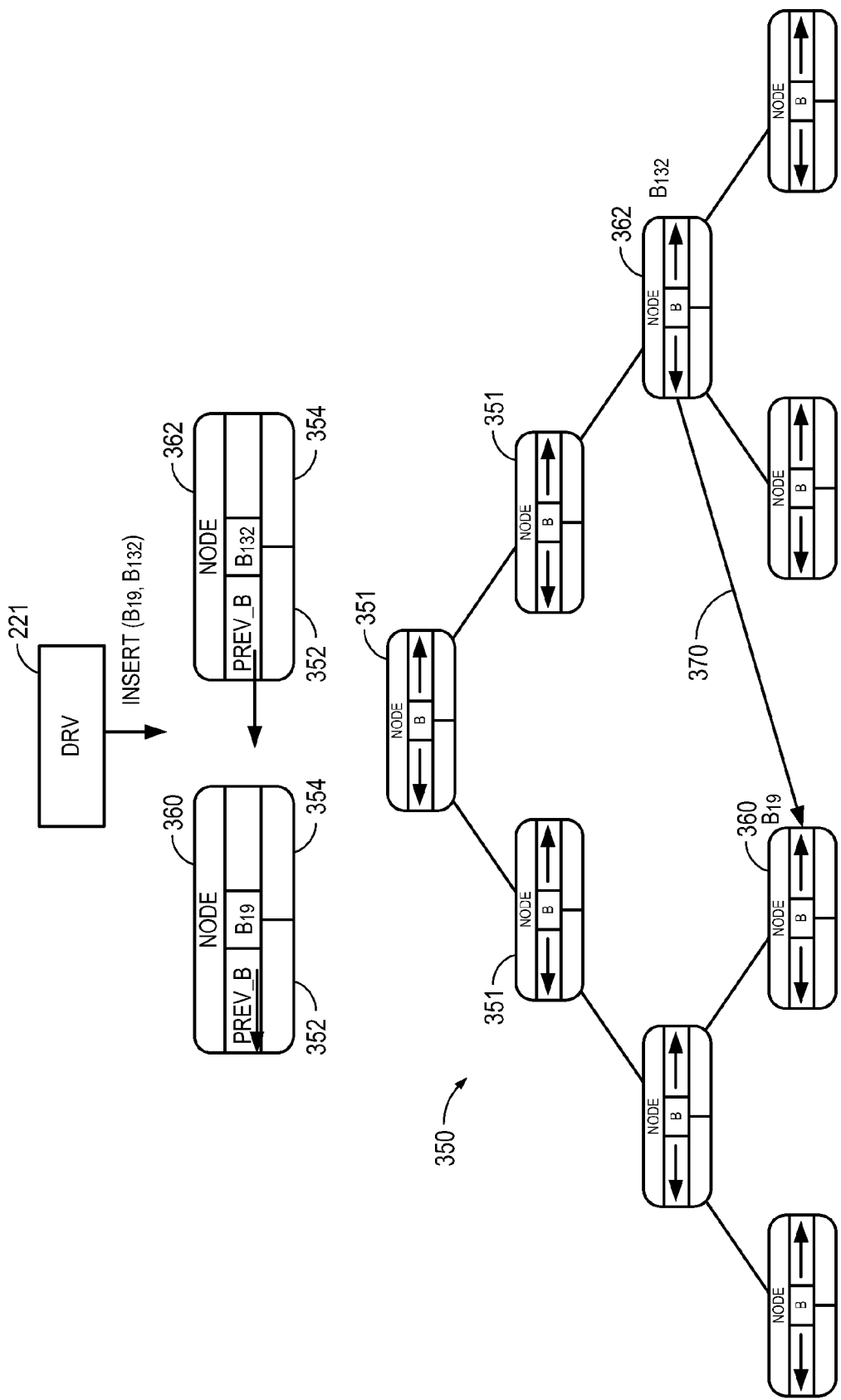
FIG. 3B is an example of the use of a sorting tree.

As another example, with brief reference to FIG. 3B, a sorting tree 350 of input and output buffer designations to implement buffer tracking to determine the usage rules to be applied to the decrypted video content may be utilized. For example, it may be assumed a decryption operation has been approved by a DRM rule 213 for an application 303, as previously described, and the decrypted video content is to be outputted by output driver 223 with the O B designation: $B_{54}$. Based upon this, the secure processor 215 can determine by the sorting tree 350 that the I/O B designation for the DP driver 222 is $B_{132}$ and $B_{54}$; that the I/O B designation for the codecs driver 221 is $B_{19}$ and $B_{132}$; and that the cryptoprocessor O B designation is $B_{19}$. As particularly shown in FIG. 3B, a sorting tree 350 may be utilized that has a plurality of nodes 351. Each node 351 may have left and right pointers 352 and 354. In this example, the driver is the codecs driver 221 and there are two associated nodes 360 and 362 having I/O buffer designations for the codecs driver 221 of $B_{19}$ and $B_{132}$, respectively. Based upon this, a direct path 370 through tree nodes 350 from node 362 ($B_{132}$) to node 360 ($B_{19}$) may be made. Based upon this (from $B_{19}$), the secure processor 112 can determine the particular DRM rules 213, and the particular usage rules to be applied, in this case: Session 3 Usage Rules, as previously described. The sorting tree 350 embodiment provides a flexible approach to implement buffer tracking.

Various drivers have been referred to. It should be appreciated that the drivers may be purely hardware implementations or combinations of hardware, firmware, software, etc., implementations. Also, although reference has been made to decrypting video content, it should be appreciated that embodiments may also work in reverse as to encrypting video content. Moreover, it should be appreciated that embodiments of the invention may be utilized not only with video content, but with any type of digital content.

Figure 4:
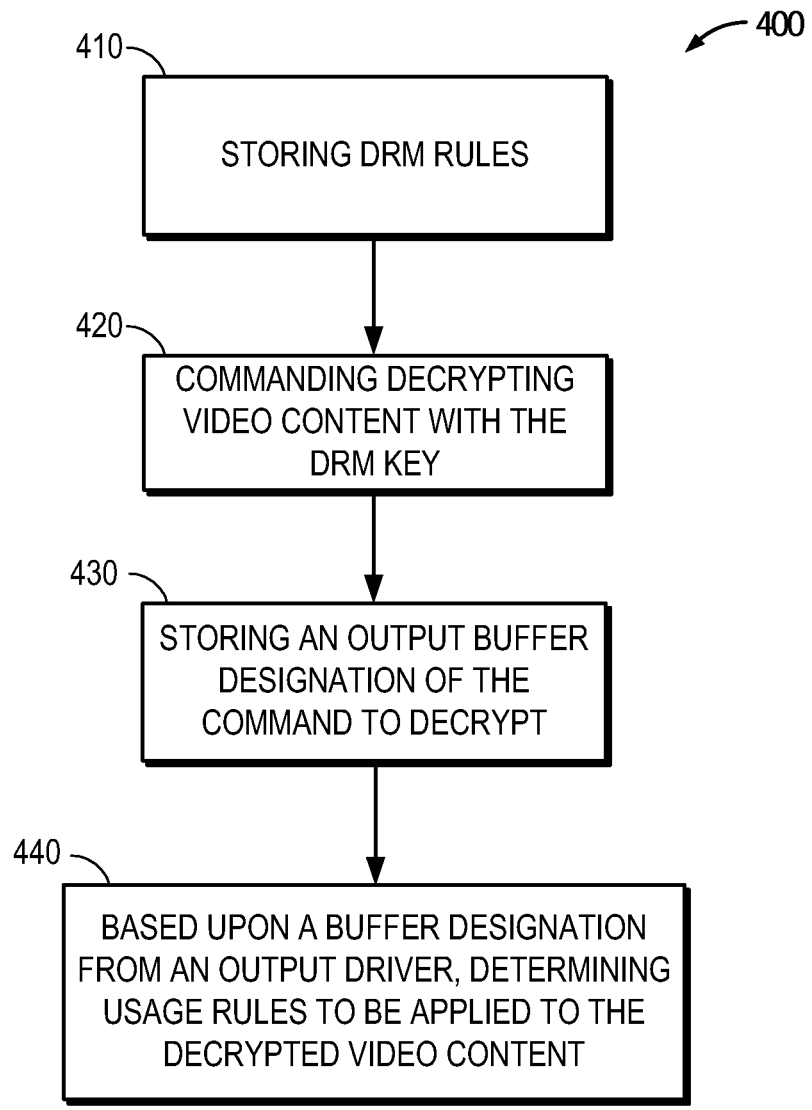
FIG. 4 is flow diagram illustrating a process to determine usage rules to be applied to decrypted video content.

With additional reference to FIG. 4, FIG. 4 is flow diagram illustrating a process 400 to determine usage rules to be applied to decrypted video content. At block 410, digital rights management (DRM) rules are stored associated with a DRM key and usage rules. Also, a buffer tracking table is created. At block 420, the decryption of video content is commanded with the DRM key. At block 430, an output buffer designation for the command to decrypt video content is stored in the buffer tracking table. Further, a plurality of input and output buffer designations from a plurality of video content drivers are stored in the buffer tracking table. At block 440, based upon a received buffer designation from an output driver to display video content, usage rules to be applied to the decrypted video content for display are determined.

It should be appreciated that aspects of the invention previously described may be implemented in conjunction with the execution of instructions by processors of the device, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computing device comprising:
   a secure hardware processor configured to:
   store digital rights management (DRM) rules associated with a DRM key and usage rules for a session;
   command a cryptoprocessor to decrypt video content with the DRM key and to log an output buffer designation of the command to decrypt the video content;
   store the output buffer designation for the command to decrypt video content and the associated usage rules in a buffer tracking table;
   store a plurality of input and output buffer designations from a plurality of video content drivers in the buffer tracking table; and
   determine usage rules to be applied to the decrypted video content for display, based upon a received buffer designation from an output driver to display video content, wherein, based upon the stored output buffer designation of the cryptoprocessor and the plurality of input and output buffer designations of video content drivers stored in the buffer tracking table, an original buffer for DRM rules is determined that is associated with the usage rules to be applied to the decrypted video content.

2. The computing device of claim 1, wherein, one of the plurality of input and output buffer designations from one of the plurality of video content drivers includes an input and output buffer designation for a codec driver to uncompress the video content.

3. The computing device of claim 1, wherein, one of the plurality of input and output buffer designations from one of the plurality of video content drivers includes an input and output buffer designation for a display processing (DP) driver to process video content for display on a device display.

4. The computing device of claim 1, wherein, the usage rules include channels that video content is deliverable on.

5. The computing device of claim 1, wherein, the usage rules include at least one of restrictions on recording or quality, output blocking, or encryption enforcement.

6. The computing device of claim 1, wherein, circular arrays are utilized based upon the plurality of input and output buffer designations for buffer tracking to determine the usage rules to be applied to the decrypted video content.

7. The computing device of claim 1, wherein, sorting trees are utilized based upon the plurality of input and output buffer designations for buffer tracking to determine the usage rules to be applied to the decrypted video content.

8. A method implemented by a secure hardware processor to determine usage rules comprising:
storing digital rights management (DRM) rules associated with a content license and usage rules for a session;
creating a buffer tracking table;
commanding the decryption of video content with a DRM key;
storing an output buffer designation for the command to decrypt video content and the associated usage rules in the buffer tracking table;
storing a plurality of input and output buffer designations from a plurality of video content drivers in the buffer tracking table; and
determining usage rules to be applied to the decrypted video content for display, based upon a received buffer designation from an output driver to display video content, wherein, based upon the plurality of input and output buffer designations of video content drivers stored in the buffer tracking table, an original buffer for DRM rules is determined that is associated with the usage rules to be applied to the decrypted video content.

9. The method of claim 8, wherein, one of the plurality of input and output buffer designations from one of the plurality of video content drivers includes an input and output buffer designation for a codec driver to uncompress the video content.

10. The method of claim 8, wherein, one of the plurality of input and output buffer designations from one of the plurality of video content drivers includes an input and output buffer designation for a display processing (DP) driver to process video content for display on a device display.

11. The method of claim 8, wherein, the usage rules include channels that video content is deliverable on.

12. The method of claim 8, wherein, the usage rules include at least one of restrictions on recording or quality, output blocking, or encryption enforcement.

13. The method of claim 8, further comprising utilizing circular arrays, based upon the plurality of input and output buffer designations, for buffer tracking to determine the usage rules to be applied to the decrypted video content.

14. The method of claim 8, further comprising utilizing sorting trees, based upon the plurality of input and output buffer designations, for buffer tracking to determine the usage rules to be applied to the decrypted video content.

15. A non-transitory computer-readable medium including code that, when executed by a secure hardware processor, causes the secure hardware processor to:
store digital rights management (DRM) rules associated with a content license and usage rules for a session;
create a buffer tracking table;
command the decryption of video content with a DRM key;
store an output buffer designation for the command to decrypt video content and the associated usage rules in the buffer tracking table;
store a plurality of input and output buffer designations from a plurality of video content drivers in the buffer tracking table; and
determine usage rules to be applied to the decrypted video content for display, based upon a received buffer designation from an output driver to display video content, wherein, based upon the plurality of input and output buffer designations of video content drivers stored in the buffer tracking table, an original buffer for DRM rules is determined that is associated with the usage rules to be applied to the decrypted video content.

16. The computer-readable medium of claim 15, wherein, one of the plurality of input and output buffer designations from one of the plurality of video content drivers includes an input and output buffer designation for a codec driver to uncompress the video content.

17. The computer-readable medium of claim 15, wherein, one of the plurality of input and output buffer designations from one of the plurality of video content drivers includes an input and output buffer designation for a display processing (DP) driver to process video content for display on a device display.

18. The computer-readable medium of claim 15, wherein, the usage rules include channels that video content is deliverable on.

19. The computer-readable medium of claim 15, wherein, the usage rules include at least one of restrictions on recording or quality, output blocking, or encryption enforcement.

20. The computer-readable medium of claim 15, further comprising code to utilize circular arrays, based upon the plurality of input and output buffer designations, for buffer tracking to determine the usage rules to be applied to the decrypted video content.

21. The computer-readable medium of claim 15, further comprising code to utilize sorting trees, based upon the plurality of input and output buffer designations, for buffer tracking to determine the usage rules to be applied to the decrypted video content.

22. A computing device comprising:
a secure hardware processor, comprising:
means for storing digital rights management (DRM) rules associated with a content license and usage rules for a session;
means for creating a buffer tracking table;
means for commanding the decryption of video content with a DRM key;
means for storing an output buffer designation for the command to decrypt video content and the associated usage rules in the buffer tracking table;

means for storing a plurality of input and output buffer designations from a plurality of video content drivers in the buffer tracking table; and means for determining usage rules to be applied to the decrypted video content for display, based upon a received buffer designation from an output driver to display video content, wherein, based upon the plurality of input and output buffer designations of video content drivers stored in the buffer tracking table, an original buffer for DRM rules is determined that is associated with the usage rules to be applied to the decrypted video content.

23. The computing device of claim 22, wherein, one of the plurality of input and output buffer designations from one of the plurality of video content drivers includes an input and output buffer designation for a codec driver to uncompress the video content.

24. The computing device of claim 22, wherein, one of the plurality of input and output buffer designations from one of the plurality of video content drivers includes an input and output buffer designation for a display processing (DP) driver to process video content for display on a device display.

25. The computing device of claim 22, wherein, the usage rules include channels that video content is deliverable on.

26. The computing device of claim 22, wherein, the usage rules include at least one of restrictions on recording or quality, output blocking, or encryption enforcement.

* * * * *